US012679493B2

(12) United States Patent
Rowe et al.

(10) Patent No.: US 12,679,493 B2
(45) Date of Patent: Jul. 14, 2026

(54) BICYCLE FRAME WITH VIBRATION ISOLATION

(71) Applicant: Toyota Motor Engineering & Manufacturing North America, Inc., Plano, TX (US)

(72) Inventors: Michael Paul Rowe, Pinckney, MI (US); Paul A. Gilmore, Ann Arbor, MI (US); Umesh N. Gandhi, Farmington Hills, MI (US)

(73) Assignees: Toyota Motor Engineering & Manufacturing North America, Inc., Plano, TX (US); Toyota Jidosha Kabushiki Kaisha, Toyota (JP)

( * ) Notice: Subject to any disclaimer, the term of this patent is extended or adjusted under 35 U.S.C. 154(b) by 692 days.

(21) Appl. No.: 18/094,111

(22) Filed: Jan. 6, 2023

(65) Prior Publication Data
US 2024/0227969 A1 Jul. 11, 2024

(51) Int. Cl.
*B62K 3/02* (2006.01)
*B62K 21/02* (2006.01)
(Continued)

(52) U.S. Cl.
CPC ................ *B62K 3/02* (2013.01); *B62K 21/02* (2013.01); *B62K 21/12* (2013.01); *B62K 21/14* (2013.01);
(Continued)

(58) Field of Classification Search
CPC .......... B62K 3/02; B62K 21/02; B62K 21/12; B62K 2201/00; B62K 21/14; B62K 21/18; B62K 21/20
See application file for complete search history.

(56) References Cited

U.S. PATENT DOCUMENTS

| | | | |
|---|---|---|---|
| 82,276 A | 9/1868 | Belleville | |
| 602,354 A * | 4/1898 | Ohlgart | A63G 19/00 |
| | | | 280/227 |

(Continued)

FOREIGN PATENT DOCUMENTS

| | | |
|---|---|---|
| CN | 2548884 Y | 5/2003 |
| CN | 1460081 A | 12/2003 |

(Continued)

OTHER PUBLICATIONS

Gilmore et al., U.S. Appl. No. 17/571,969, filed Jan. 10, 2022.
(Continued)

*Primary Examiner* — Timothy Wilhelm
(74) *Attorney, Agent, or Firm* — Christopher G. Darrow; Darrow Mustafa PC

(57) ABSTRACT

A bicycle can include a frame. The frame can include a front steering axle, a front fork assembly, and a handlebar assembly for steering a front wheel of the bicycle. The bicycle can also include one or more vibration isolators. The one or more vibration isolators can be operatively connected to at least one of the frame, the front steering axle, the front fork assembly, and the handlebar assembly. The one or more vibration isolators can also be configured to exhibit a non-linear stiffness profile including a region of quasi-zero stiffness. As a result, the one or more vibration isolators isolate a rider of the bicycle from vibrations transferred through the frame.

18 Claims, 9 Drawing Sheets

(51) Int. Cl.
  *B62K 21/12*      (2006.01)
  *B62K 21/14*      (2006.01)
  *B62K 21/18*      (2006.01)
  *B62K 21/20*      (2006.01)

(52) U.S. Cl.
  CPC .............. *B62K 21/18* (2013.01); *B62K 21/20*
       (2013.01); *B62K 2201/00* (2013.01)

(56)          References Cited

U.S. PATENT DOCUMENTS

| | | | | |
|---|---|---|---|---|
| 626,602 | A * | 6/1899 | Fenton | B62K 21/14 |
| | | | | 74/551.2 |
| 640,756 | A * | 1/1900 | Douglas | F16H 57/035 |
| | | | | 474/146 |
| 714,121 | A * | 11/1902 | Williams | B62K 25/286 |
| | | | | 280/284 |
| 771,841 | A * | 10/1904 | Sills | B62K 21/14 |
| | | | | 74/551.2 |
| 1,468,835 | A * | 9/1923 | Meyer | B62K 21/14 |
| | | | | 74/551.2 |
| 1,826,597 | A | 10/1931 | Brecht | |
| 2,121,835 | A | 6/1938 | Sproul | |
| 2,162,719 | A | 6/1939 | Hay | |
| 2,263,107 | A | 11/1941 | Smirl | |
| 2,325,561 | A * | 7/1943 | Weber et al. | B62K 25/04 |
| | | | | 267/250 |
| 2,655,935 | A | 10/1953 | Kinzbach | |
| 2,753,177 | A | 7/1956 | Boyd | |
| 2,973,015 | A | 2/1961 | Thompson | |
| 2,991,655 | A | 7/1961 | Jorgensen et al. | |
| 3,010,713 | A | 11/1961 | Turkovich | |
| 3,080,160 | A | 3/1963 | Orner | |
| 3,083,038 | A * | 3/1963 | Moulton | B62K 21/20 |
| | | | | 280/276 |
| 3,107,905 | A | 10/1963 | Lucas | |
| 3,195,923 | A * | 7/1965 | Moulton | B62K 3/10 |
| | | | | 280/281.1 |
| 3,366,082 | A | 1/1968 | Ross | |
| 3,394,631 | A | 7/1968 | Thompson | |
| 3,430,942 | A | 3/1969 | Toth et al. | |
| 3,559,512 | A | 2/1971 | Aggarwal | |
| 3,574,347 | A | 4/1971 | Hughes | |
| 3,608,883 | A | 9/1971 | Russold et al. | |
| 3,743,266 | A | 7/1973 | Sturman et al. | |
| 3,836,195 | A | 9/1974 | Teeri | |
| 3,856,242 | A * | 12/1974 | Cook | F16F 15/06 |
| | | | | 248/548 |
| 3,858,665 | A | 1/1975 | Winker | |
| 3,873,079 | A * | 3/1975 | Kuus | F16F 1/32 |
| | | | | 267/162 |
| 3,980,016 | A | 9/1976 | Taylor | |
| 4,168,101 | A | 9/1979 | DiGrande | |
| 4,179,135 | A * | 12/1979 | Slater | B62K 25/24 |
| | | | | 280/276 |
| 4,215,841 | A | 8/1980 | Herring, Jr. | |
| 4,351,556 | A | 9/1982 | Worringer | |
| 4,421,337 | A * | 12/1983 | Pratt | B62K 25/30 |
| | | | | 280/277 |
| 4,457,213 | A | 7/1984 | Morgan | |
| 4,530,491 | A | 7/1985 | Bucksbee et al. | |
| 4,568,067 | A | 2/1986 | Iwata | |
| 4,612,429 | A | 9/1986 | Milianowicz | |
| 4,779,852 | A | 10/1988 | Wassell | |
| 4,799,654 | A | 1/1989 | Eickmann | |
| 4,824,338 | A | 4/1989 | Eickmann | |
| 4,850,643 | A | 7/1989 | Rollman | |
| 4,925,203 | A * | 5/1990 | Buckler | B62K 3/02 |
| | | | | 280/288.1 |
| 4,984,777 | A | 1/1991 | Kurr et al. | |
| 5,163,697 | A * | 11/1992 | Kastan | B62K 21/20 |
| | | | | 280/276 |
| 5,178,357 | A | 1/1993 | Platus | |
| 5,222,709 | A | 6/1993 | Culley, Jr. et al. | |

| | | | | |
|---|---|---|---|---|
| 5,248,159 | A * | 9/1993 | Moore | B62K 25/08 |
| | | | | 267/202 |
| 5,263,694 | A | 11/1993 | Smith et al. | |
| 5,285,697 | A * | 2/1994 | Clausen | B62K 21/14 |
| | | | | 74/551.2 |
| 5,301,974 | A * | 4/1994 | Knapp | B62K 21/20 |
| | | | | 267/221 |
| 5,310,157 | A | 5/1994 | Platus | |
| 5,314,207 | A * | 5/1994 | Camfield | B62K 9/00 |
| | | | | 280/828 |
| 5,335,929 | A * | 8/1994 | Takagaki | B62K 25/286 |
| | | | | 280/283 |
| 5,354,085 | A * | 10/1994 | Gally | B62M 9/16 |
| | | | | 280/285 |
| 5,390,903 | A | 2/1995 | Fidziukiewicz | |
| 5,417,446 | A | 5/1995 | Pileggi | |
| 5,441,292 | A * | 8/1995 | Busby | B62K 25/30 |
| | | | | 280/284 |
| 5,462,302 | A * | 10/1995 | Leitner | B62K 21/02 |
| | | | | 280/277 |
| 5,489,139 | A | 2/1996 | McFarland | |
| 5,498,013 | A * | 3/1996 | Hwang | B62K 25/04 |
| | | | | 280/281.1 |
| 5,501,477 | A * | 3/1996 | Moreau | B62K 21/14 |
| | | | | 280/281.1 |
| 5,505,493 | A * | 4/1996 | Camfield | B62K 9/00 |
| | | | | 280/828 |
| 5,507,476 | A | 4/1996 | Lin | |
| 5,509,676 | A | 4/1996 | Fukutake et al. | |
| 5,509,679 | A * | 4/1996 | Leitner | B62K 25/30 |
| | | | | 280/284 |
| 5,511,444 | A * | 4/1996 | Clausen | B62K 21/14 |
| | | | | 403/120 |
| 5,570,896 | A * | 11/1996 | Collins | B62K 25/30 |
| | | | | 267/293 |
| 5,599,034 | A * | 2/1997 | Brigden | B62K 25/16 |
| | | | | 280/276 |
| 5,669,594 | A | 9/1997 | Platus et al. | |
| 5,669,598 | A * | 9/1997 | Ticey | F16F 1/32 |
| | | | | 425/410 |
| 5,678,457 | A * | 10/1997 | Hals | B62K 21/14 |
| | | | | 74/551.2 |
| 5,909,890 | A * | 6/1999 | Sachs | B62K 25/286 |
| | | | | 188/300 |
| 5,924,714 | A * | 7/1999 | Farris | B62K 21/20 |
| | | | | 280/279 |
| 5,954,355 | A * | 9/1999 | Hsu | B62K 25/08 |
| | | | | 403/DIG. 7 |
| 6,007,148 | A | 12/1999 | Yu | |
| 6,089,656 | A * | 7/2000 | Hals | B62J 1/04 |
| | | | | 297/211 |
| 6,099,010 | A * | 8/2000 | Busby | B62K 25/30 |
| | | | | 280/283 |
| 6,135,477 | A * | 10/2000 | D'Aluisio | F16F 9/3235 |
| | | | | 280/283 |
| 6,164,424 | A * | 12/2000 | Girvin | F16F 9/46 |
| | | | | 188/316 |
| 6,176,476 | B1 * | 1/2001 | Wang | B62J 1/06 |
| | | | | 267/132 |
| 6,244,610 | B1 * | 6/2001 | Kramer-Massow | |
| | | | | B62K 25/286 |
| | | | | 280/283 |
| 6,260,870 | B1 * | 7/2001 | Fan | B62K 25/08 |
| | | | | 280/276 |
| 6,260,918 | B1 | 7/2001 | Lee | |
| 6,270,065 | B1 | 8/2001 | Hals | |
| 6,354,556 | B1 | 3/2002 | Ritchie et al. | |
| 6,371,463 | B1 | 4/2002 | Sorovshian | |
| 6,409,130 | B1 | 6/2002 | Maret | |
| 6,425,598 | B2 * | 7/2002 | Murayama | B62K 15/008 |
| | | | | 280/200 |
| 6,443,524 | B1 * | 9/2002 | Yu | B62J 1/02 |
| | | | | 297/211 |
| 6,530,564 | B1 | 3/2003 | Julien | |
| 6,581,494 | B2 * | 6/2003 | Sechler | B62M 3/00 |
| | | | | 74/594.1 |

(56) References Cited

U.S. PATENT DOCUMENTS

| | | | | |
|---|---|---|---|---|
| 6,592,136 B2 * | 7/2003 | Becker | F16F 9/44 | |
| | | | 188/282.1 | |
| 6,659,488 B1 * | 12/2003 | Beresnitzky | B62K 15/00 | |
| | | | 280/282 | |
| 6,712,374 B2 * | 3/2004 | Assier | B62K 25/286 | |
| | | | 280/284 | |
| 6,886,845 B2 * | 5/2005 | Chao | B62K 15/00 | |
| | | | 280/278 | |
| 6,935,157 B2 * | 8/2005 | Miller | B62K 19/34 | |
| | | | 73/11.04 | |
| 6,935,693 B2 | 8/2005 | Janscha et al. | | |
| 6,939,097 B2 | 9/2005 | Carr et al. | | |
| RE39,159 E * | 7/2006 | Klassen | B62K 25/286 | |
| | | | 280/283 | |
| 7,146,877 B2 | 12/2006 | You | | |
| 7,152,839 B2 | 12/2006 | Mullinix et al. | | |
| 7,168,726 B2 * | 1/2007 | Klein | B62K 25/04 | |
| | | | 280/284 | |
| 7,207,585 B2 * | 4/2007 | Czysz | B62K 21/20 | |
| | | | 180/219 | |
| 7,261,310 B2 * | 8/2007 | Yifrah | B62K 19/36 | |
| | | | 280/288.4 | |
| 7,540,516 B2 * | 6/2009 | Arnce | B62K 21/14 | |
| | | | 280/283 | |
| 7,581,743 B2 * | 9/2009 | Graney | B62K 25/286 | |
| | | | 280/284 | |
| 7,591,475 B1 * | 9/2009 | Calfee | B62K 25/04 | |
| | | | 280/284 | |
| D614,538 S * | 4/2010 | Rochon | D12/111 | |
| 7,722,070 B2 * | 5/2010 | Ritchey | B62K 15/00 | |
| | | | 280/278 | |
| 7,722,072 B2 * | 5/2010 | Hoogendoorn | B62K 25/286 | |
| | | | 280/284 | |
| 7,798,513 B1 * | 9/2010 | Salvant | B62M 3/00 | |
| | | | 280/294 | |
| 7,822,522 B2 | 10/2010 | Wereley et al. | | |
| 7,854,425 B2 * | 12/2010 | Evans | F16F 3/02 | |
| | | | 267/162 | |
| 7,874,576 B2 | 1/2011 | Gandhi | | |
| 8,006,993 B1 * | 8/2011 | Chamberlain | B62K 25/22 | |
| | | | 280/281.1 | |
| 8,053,068 B2 | 11/2011 | Fanucci et al. | | |
| 8,166,626 B2 | 5/2012 | Sereni et al. | | |
| 8,185,988 B2 | 5/2012 | Wieland | | |
| 8,366,082 B2 | 2/2013 | Evans | | |
| 8,439,383 B2 * | 5/2013 | Talavasek | B62K 21/02 | |
| | | | 280/285 | |
| 8,464,609 B2 * | 6/2013 | Shiu | B62K 15/006 | |
| | | | 280/278 | |
| 8,500,108 B2 * | 8/2013 | Rode | F16F 1/32 | |
| | | | 267/260 | |
| 8,556,284 B2 * | 10/2013 | Appleman | B62K 3/00 | |
| | | | 280/278 | |
| 8,585,026 B2 | 11/2013 | Dittmar | | |
| 8,707,825 B2 * | 4/2014 | Shiu | B62M 3/00 | |
| | | | 280/278 | |
| 8,807,585 B2 * | 8/2014 | Alan | B62K 19/30 | |
| | | | 280/274 | |
| 8,888,117 B2 * | 11/2014 | Barkley | B62J 1/02 | |
| | | | 280/283 | |
| 8,919,751 B2 | 12/2014 | Kneidel | | |
| 8,925,949 B2 * | 1/2015 | Zecchetto | G06Q 10/30 | |
| | | | 280/281.1 | |
| 9,156,521 B2 * | 10/2015 | Lumpkin | B62K 3/02 | |
| 9,194,452 B2 | 11/2015 | Hawkins et al. | | |
| 9,359,036 B2 * | 6/2016 | Thompson | B62J 11/13 | |
| 9,394,950 B1 | 7/2016 | Henry et al. | | |
| 9,408,428 B2 | 8/2016 | Gaudet | | |
| 9,550,542 B2 * | 1/2017 | Figueroa | B60K 1/04 | |
| 9,561,834 B2 * | 2/2017 | Zawistowski | B62K 25/28 | |
| 9,669,891 B2 * | 6/2017 | Evans | B62K 9/00 | |
| 9,714,065 B2 * | 7/2017 | Mondello | B62J 25/06 | |
| 9,764,788 B1 | 9/2017 | Sung | | |

| | | | | |
|---|---|---|---|---|
| 9,821,879 B2 * | 11/2017 | Hoogendoorn | B62K 25/286 | |
| 9,926,033 B1 * | 3/2018 | Tsai | B62K 21/20 | |
| 9,950,760 B2 | 4/2018 | Ahnert et al. | | |
| 9,957,007 B2 * | 5/2018 | Bigolin | B62J 1/02 | |
| 9,981,713 B2 * | 5/2018 | Tsai | B62K 21/20 | |
| 10,039,953 B2 * | 8/2018 | Prosnitz | B62K 13/00 | |
| 10,300,974 B1 * | 5/2019 | O'Reilly | B62H 7/00 | |
| 10,351,206 B2 * | 7/2019 | Voss | B62K 15/006 | |
| 10,371,229 B2 * | 8/2019 | Gandhi | F16F 15/06 | |
| 10,532,672 B1 | 1/2020 | Pinkelman et al. | | |
| 10,611,424 B2 * | 4/2020 | McFarland | B62K 25/02 | |
| 10,677,310 B2 * | 6/2020 | Gandhi | F16F 15/06 | |
| 10,766,563 B2 * | 9/2020 | Hoogendoorn | B62K 25/286 | |
| 10,822,048 B2 * | 11/2020 | Hoogendorn | B62K 25/28 | |
| 10,850,785 B2 * | 12/2020 | O'Reilly | B62H 7/00 | |
| 10,926,830 B2 * | 2/2021 | Zawistowski | B62K 25/30 | |
| 11,040,754 B2 * | 6/2021 | Lynch | F16F 13/007 | |
| 11,137,045 B2 * | 10/2021 | Gandhi | F16F 1/32 | |
| 11,173,983 B2 * | 11/2021 | Zawistowski | B62K 25/286 | |
| 11,242,113 B2 * | 2/2022 | Gatto | B62M 3/00 | |
| 11,299,231 B2 * | 4/2022 | Tsutsui | B62K 21/12 | |
| 11,312,445 B2 * | 4/2022 | Zubieta Andueza | B62K 25/18 | |
| 11,338,711 B1 * | 5/2022 | Gilmore | B60N 2/546 | |
| 11,485,437 B2 * | 11/2022 | Gilmore | B62J 1/02 | |
| 11,565,763 B1 | 1/2023 | Gilmore et al. | | |
| 11,603,153 B1 | 3/2023 | Trager et al. | | |
| 11,603,903 B2 | 3/2023 | Gandhi et al. | | |
| 11,628,898 B1 * | 4/2023 | Trager | B62J 1/065 | |
| | | | 280/226.1 | |
| 11,827,299 B2 * | 11/2023 | Gilmore | B62J 1/065 | |
| 11,927,236 B2 | 3/2024 | Gandhi et al. | | |
| 12,129,902 B2 * | 10/2024 | Gilmore | B60N 2/546 | |
| 12,134,439 B2 * | 11/2024 | Barenbrug | B62K 5/06 | |
| 12,246,792 B2 * | 3/2025 | Watanabe | B62K 19/34 | |
| 12,337,926 B2 * | 6/2025 | Looney | B62K 25/08 | |
| 2002/0084620 A1 * | 7/2002 | Yu | B62K 25/30 | |
| | | | 280/283 | |
| 2004/0061305 A1 * | 4/2004 | Christini | B62K 25/286 | |
| | | | 280/284 | |
| 2004/0070165 A1 * | 4/2004 | Liebetrau | B62K 19/34 | |
| | | | 280/259 | |
| 2004/0201199 A1 * | 10/2004 | Liebetrau | B62K 13/08 | |
| | | | 280/278 | |
| 2004/0245830 A1 | 12/2004 | Scheck et al. | | |
| 2006/0260432 A1 | 11/2006 | Hsu | | |
| 2007/0138720 A1 | 6/2007 | Evans | | |
| 2008/0054595 A1 * | 3/2008 | Lu | B62K 25/286 | |
| | | | 280/284 | |
| 2009/0025833 A1 | 1/2009 | Schussler | | |
| 2009/0226691 A1 | 9/2009 | Mankame et al. | | |
| 2011/0037210 A1 | 2/2011 | Rode | | |
| 2011/0285106 A1 * | 11/2011 | Talavasek | B62K 21/02 | |
| | | | 280/284 | |
| 2012/0018577 A1 | 1/2012 | Quiroz-Hernandez | | |
| 2012/0223504 A1 * | 9/2012 | Antonot | B62K 25/286 | |
| | | | 280/284 | |
| 2014/0015220 A1 * | 1/2014 | Talavasek | B62K 25/286 | |
| | | | 280/275 | |
| 2014/0110979 A1 | 4/2014 | Barkley et al. | | |
| 2014/0174247 A1 | 6/2014 | Kovalak, Jr. et al. | | |
| 2014/0265468 A1 * | 9/2014 | Greenhill | B62J 1/02 | |
| | | | 297/208 | |
| 2014/0274582 A1 * | 9/2014 | Simmons | B62K 17/00 | |
| | | | 482/57 | |
| 2015/0115569 A1 * | 4/2015 | Matheson | B62K 25/04 | |
| | | | 280/284 | |
| 2015/0298580 A1 | 10/2015 | Kanai | | |
| 2016/0009156 A1 | 1/2016 | Leonard et al. | | |
| 2016/0068085 A1 | 3/2016 | Mindel et al. | | |
| 2016/0075400 A1 * | 3/2016 | Ragland | B62K 11/04 | |
| | | | 29/401.1 | |
| 2016/0152290 A1 | 6/2016 | Bigolin | | |
| 2018/0195570 A1 | 7/2018 | Churchill et al. | | |
| 2018/0195571 A1 | 7/2018 | Churchill et al. | | |
| 2018/0312086 A1 * | 11/2018 | Meingast | B60N 2/7017 | |
| 2018/0339744 A1 * | 11/2018 | McFarland | B62J 13/04 | |
| 2019/0186587 A1 | 6/2019 | Gandhi et al. | | |
| 2019/0186588 A1 | 6/2019 | Gandhi et al. | | |

(56)        References Cited

U.S. PATENT DOCUMENTS

| | | | |
|---|---|---|---|
| 2019/0186589 A1 | 6/2019 | Gandhi et al. | |
| 2020/0238781 A1 | 7/2020 | Hadi | |
| 2020/0298732 A1 | 9/2020 | Gandhi et al. | |
| 2020/0393013 A1* | 12/2020 | Schneider | F16F 3/02 |
| 2021/0009228 A1* | 1/2021 | Yi | A63B 22/0087 |
| 2022/0144152 A1* | 5/2022 | Gilmore | B60N 2/544 |
| 2022/0145957 A1* | 5/2022 | Gilmore | B60N 2/54 |
| 2022/0145958 A1 | 5/2022 | Gilmore et al. | |
| 2022/0153370 A1 | 5/2022 | Gilmore et al. | |
| 2022/0196109 A1 | 6/2022 | Gandhi et al. | |
| 2022/0196111 A1 | 6/2022 | Gandhi et al. | |
| 2022/0299083 A1 | 9/2022 | Gilmore et al. | |
| 2022/0299084 A1* | 9/2022 | Gilmore | F16F 15/002 |
| 2024/0083535 A1* | 3/2024 | Watanabe | B62K 9/00 |
| 2024/0199158 A1 | 6/2024 | Gilmore et al. | |
| 2024/0253725 A1* | 8/2024 | Pfaeffle | B62K 25/286 |

FOREIGN PATENT DOCUMENTS

| | | |
|---|---|---|
| CN | 202811955 U | 3/2013 |
| CN | 103899704 B | 11/2015 |
| CN | 112061292 A | 12/2020 |
| CN | 114033062 A | 2/2022 |
| CN | 217575496 U | 10/2022 |
| DE | 4232655 C2 | 11/1997 |
| JP | 2006027497 A | 2/2006 |
| JP | 2011201378 A | 10/2011 |
| KR | 102106610 B1 | 5/2020 |
| TW | M612680 U | 6/2021 |
| WO | 2009027681 A1 | 3/2009 |

OTHER PUBLICATIONS

Trager et al., U.S. Appl. No. 17/571,951, filed Jan. 10, 2022.
Trager et al., U.S. Appl. No. 17/571,940, filed Jan. 10, 2022.

International Search Report and Written Opinion for International Application No. PCT/US2023/085323, mailed on Apr. 24, 2024 (11 pages).
Carrella et al., "Demonstrator to show the effects of negative stiffness on the natural frequency of a simple oscillator", MES (2008) Proceedings of the Institution of Mechanical Engineers, Part C: Journal of Mechanical Engineering Science, vol. 222 (7), pp. 1189-1192 (4 pages).
Le, Thanh Dahn et al., "Experimental investigation of a vibration isolation system using negative stiffness structure", International Journal of Mechanical Sciences (2013) International Journal of Mechanical Sciences 170 (2013) pp. 99-112 (14 pages).
Lee, Thanh Danh et al., "A vibration isolation system in low frequency excitation region using negative stiffness structure for vehicle seat", Journal of Sound and Vibration 330 ( 2011) pp. 6311-6335 (25 pages).
Lee, C.M. et al., "A multi-stage high-speed railroad vibration isolation system with "negative" stiffness", Journal of Sound and Vibration 331 (2012) pp. 914-921 (8 pages).
Lee, et al., "Position control of seat suspension with minimum stiffness," Journal of Sound and Vibration 292 (2006) pp. 435-442 (8 pages).
Panagiotopoulos et al., "Advanced ultra-light multifunctional metallic-glass wave springs", Materials and Design, 2020 (10 pages).
Spaggiari et al., "Multiphysics Modelling and Design of Shape Memory Alloy Wave Springs as Linear Actuators", Proceedings of the ASME 2010 Conference on Smart Materials, Adaptive Structures and Intelligent Systems, Sep. 28-Oct. 1, 2010, Philadelphia, PA (9 pages).
Li et al., "A highly adjustable magnetorheological elastomer base isolator for real-time adaptive control", Smart Materials and Structures, Aug. 2013 (25 pages).
"Belleville Springs." Encyclopedia of Vibration, 2001.
Gilmore et al., U.S. Appl. No. 18/084,195, filed Dec. 19, 2022.
Rowe et al., U.S. Appl. No. 18/094,111, filed Jan. 6, 2023.

* cited by examiner

BICYCLE FRAME WITH VIBRATION ISOLATION

TECHNICAL FIELD

The subject matter described herein relates, in general, to bicycles and, more specifically, to isolating a rider of a bicycle from vibrations transferred through the frame.

BACKGROUND

The background description provided is to present the context of the disclosure generally. Work of the inventors, to the extent it may be described in this background section, and aspects of the description that may not otherwise qualify as prior art at the time of filing, are neither expressly nor impliedly admitted as prior art against the present technology.

When a rider is riding a bicycle, the rider can drive the bicycle over rough surfaces. As a result, vibrations can be transmitted to the rider through one or more components of the bicycle. These vibrations can cause rider discomfort and reduce ride quality.

SUMMARY

This section generally summarizes the disclosure and is not a comprehensive explanation of its full scope or all its features.

In one embodiment, a bicycle is disclosed. The bicycle can include a frame. The frame can include a front steering axle, a front fork assembly, and a handlebar assembly for steering a front wheel of the bicycle. The bicycle can also include one or more vibration isolators. The one or more vibration isolators can be operatively connected to at least one of the frame, the front steering axle, the front fork assembly, and the handlebar assembly. The one or more vibration isolators can be configured to exhibit a non-linear stiffness profile including a region of quasi-zero stiffness. The one or more vibration isolators can isolate a rider of the bicycle from vibrations transferred through the frame.

In another embodiment, a bicycle can include a frame. The frame can include a front-end. The front-end can include a front steering axle, a front fork assembly, and a handlebar assembly for steering a front wheel of the bicycle. The bicycle can also include one or more vibration isolators. The one or more vibration isolators can be configured to exhibit a non-linear stiffness profile including a region of quasi-zero stiffness. The one or more vibration isolators can include a frame vibration isolator. The frame vibration isolator can be operatively connected to the frame. The one or more vibration isolators can also include one or more front-end vibration isolators. The one or more front-end vibration isolators can be operatively connected to at least one of the front steering axle, the front fork assembly, and the handlebar assembly. The frame vibration isolator and the one or more front-end vibration isolators can be configured to synergistically isolate different body portions of a rider of the bicycle from vibrations transferred through the frame.

In yet another embodiment, a bicycle can include a frame. The frame can include a front steering axle, a front fork assembly, and a handlebar assembly for steering a front wheel of the bicycle. The bicycle can include a plurality of vibration isolators. Each of the plurality of vibration isolators can be configured to exhibit a non-linear stiffness profile including a region of quasi-zero stiffness. The plurality of vibration isolators can include a frame vibration isolator.

The frame vibration isolator can be operatively connected to the frame. The plurality of vibration isolators can also include a front steering axle vibration isolator. The front steering axle vibration isolator can be operatively connected to the front steering axle. The plurality of vibration isolators can also include two front fork vibration isolators. Each of the two front fork vibration isolators can be operatively connected to the front fork assembly. The plurality of vibration isolators can also include one or more handlebar assembly vibration isolators. Each of the one or more handlebar assembly vibration isolators can be operatively connected to the handlebar assembly. The plurality of vibration isolators can be configured to synergistically isolate an upper body portion and a lower body portion of a rider of the bicycle from vibrations transferred through the frame.

Further areas of applicability and various methods of enhancing the disclosed technology will become apparent from the description provided. The description and specific examples in this summary are intended for illustration only and are not intended to limit the scope of the present disclosure.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element can be designed as multiple elements or multiple elements can be designed as one element. In some embodiments, an element shown as an internal component of another element can be implemented as an external component and vice versa. Furthermore, elements may not be drawn to scale.

DETAILED DESCRIPTION

Standard bicycles can include springs, oil pistons, air dampers, elastomers, etc. in various elements of the bicycle to mitigate vibrations transferred to the rider during use. However, these devices only mitigate vibrations and do not actually isolate the rider from the vibrations. According to the arrangements described herein, a bicycle can include one or more vibration isolators configured to isolate the rider from vibrations transferred to the rider during use. As described in further detail below, the vibration isolator(s) can include conical springs having a near-zero region of their stress-strain curve (e.g., a quasi-zero stiffness region (QZS region)). The QZS region has the effect of isolating vibrations rather than dampening vibrations, which can improve the comfort and quality of the ride.

Figure 1:
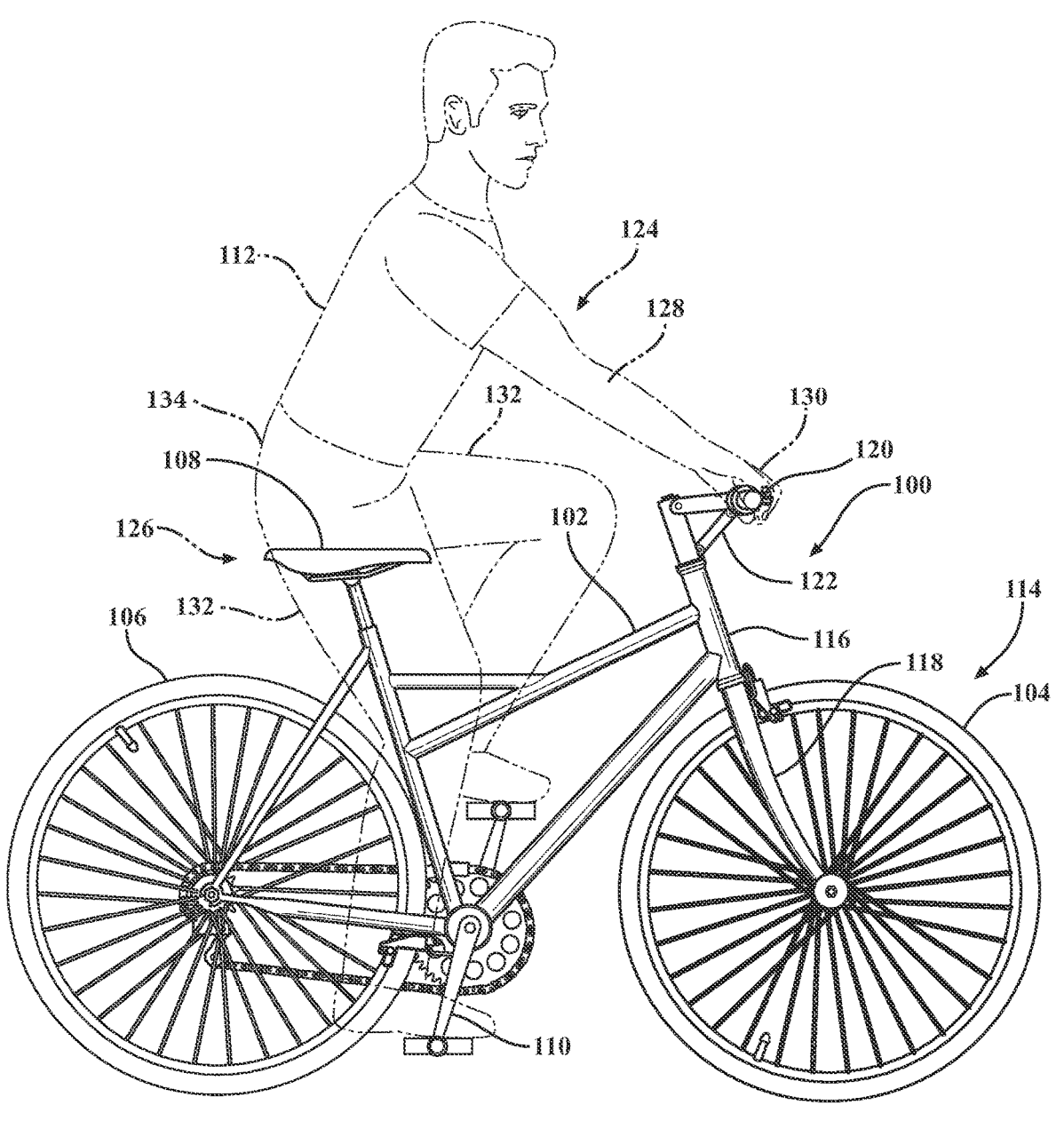
FIG. 1 illustrates an example of a bicycle and a rider using the bicycle.

Referring to FIG. 1, a representative example of a bicycle 100 is shown. The bicycle can be any type of bicycle, now know or later developed. The bicycle 100 can be entirely manually operated. In some arrangements, the bicycle 100 can be an electric bicycle. The bicycle 100 includes a frame 102. The frame 102 can be any type of frame for any type of bicycle, now known or later developed. The frame 102 can be operatively connected to a front wheel 104, a rear wheel 106, a saddle 108, and a pedal assembly 110. As used herein, the term "operatively connected" can include direct or indirect connections, including connections without direct physical contact.

The saddle 108 can be a seat and can be configured to support a rider 112 of the bicycle 100 when he or she is riding the bicycle 100. The pedal assembly 110 can be used by the rider 112 to rotate the rear wheel 106 to propel the bicycle 100 along a surface. The frame 102 can also include a front-end 114. The front-end 114 can include a front steering axle 116, a front fork assembly 118, and a handlebar assembly 120. The front steering axle 116 can be operatively connected to the front fork assembly 118 and the handlebar assembly 120. The front fork assembly 118 can be operatively connected to the front wheel 104. Rotation of the handlebar assembly 120 by the rider 112 can cause the front steering axle 116, which, in turn, can cause the front fork assembly 118 to rotate. Rotation of the front fork assembly 118 can cause rotation of the front wheel 104. In this way, the rider 112 can steer the bicycle 100. The bicycle 100 can also include a handlebar stem device 122. The handlebar stem device 122 can be any type of handlebar stem device for any type of bicycle, now known or later developed.

When the rider 112 is using the bicycle 100, different body portions or regions of the rider 112 can be supported by the bicycle. Generally, the rider 112 can have an upper body portion 124 and a lower body portion 126. The upper body portion 124 can include any part of the body of the rider 112, for example, one or more arms 128 of the rider 112, one or more hands 130 of the rider 112, etc. The lower body portion 126 can include at least any part of the body of the rider 112 below their waist, for example, at least the buttocks 134 of the rider 112. In some arrangements, the lower body portion 126 can include one or more legs 132 of the rider 112. In some instances, the upper body portion 124 can be supported by the front-end 114, for example, directly by the handlebar assembly 120 or indirectly by the frame 102, the front steering axle 116, the front fork assembly 118, and/or the front wheel 104. In some instances, the lower body portion 126 can be supported directly by the saddle 108 and/or the pedal assembly 110 or indirectly by the frame 102 and/or the rear wheel 106. It will be appreciated that other body portions of the rider 112 can be supported indirectly by other body portions that may be directly supported by the frame 102. For example, a head of the rider 112 and/or a chest or torso of the rider 112 may be indirectly supported by the arms 128 and/or the hands 130. In another example, the head, chest, and/or torso of the rider 112 may be indirectly supported by the legs 132 and/or the buttocks 134. Moreover, in some instances, the same part of the bicycle 100 can support both the upper body portion 124 and the lower body portion 126. Thus, it will be appreciated that the terms "upper body portion" and "lower body portion" are used generally to facilitate the discussion and are not intended to be limiting.

As mentioned above, the frame 102 can include one or more vibration isolators. The vibration isolator(s) will be described in further detail below. The vibration isolator(s) can be operatively connected to any suitable component or portion of the bicycle 100. Various non-limiting examples of different portions of the bicycle 100 in which the vibration isolator(s) can be used will now be described in turn below.

Figure 2:
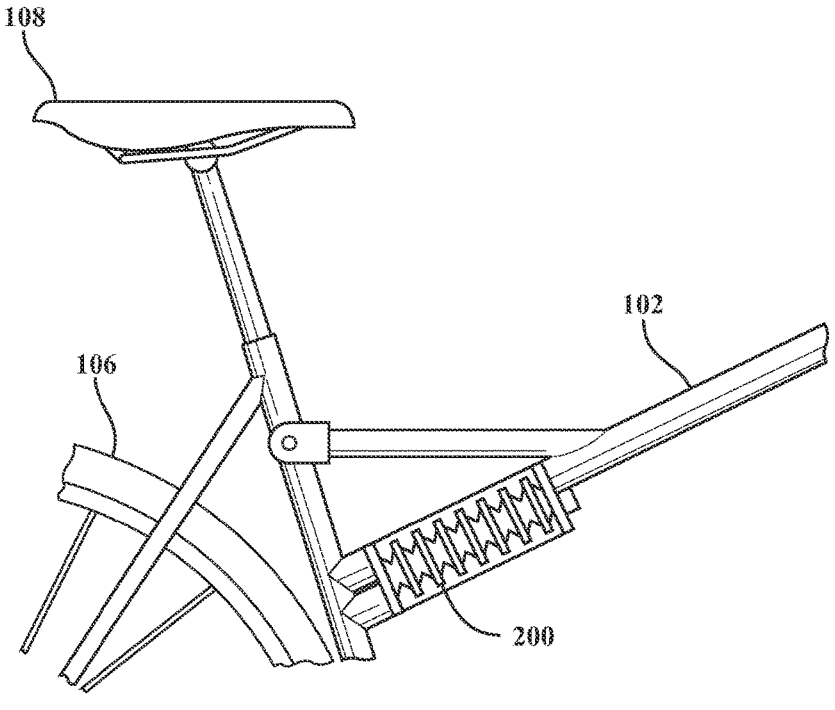
FIG. 2 illustrates an example of a frame vibration isolator operatively connected to a frame of the bicycle.

Referring to FIG. 2, the bicycle 100 can include a frame vibration isolator 200. The frame vibration isolator 200 can be operatively connected to the frame 102 in any suitable manner. In one or more arrangements, the frame vibration isolator 200 can be located within the frame 102. In such case, the frame vibration isolator 200 can be unattached within the frame 102. Alternatively, the frame vibration isolator 200 can be operatively connected to the frame 102 within the frame 102, such as by one or more fasteners, one or more adhesives, one or more forms of mechanical engagement, one or more welds or brazes, or any combination thereof. The frame vibration isolator 200 can be compressed by a portion of the rider 112 (e.g., the upper body portion 124 of the rider 112 and/or the lower body portion 126 of the rider 112). In some instances, the frame vibration isolator 200 can be compressed between the attachment points (for example, the fasteners, welds, or brazes). In other instances, the frame vibration isolator 200 can be pre-compressed to a normal and/or expected operational load before being installed to the frame 102. As used herein, "a normal and/or expected operational load" may include the load of the rider 112 when the rider 112 is using the bicycle 100. The load can correspond to the weight of the rider 112, the weight of a body portion of the rider 112 (e.g., the upper body portion 124 of the rider 112, the lower body portion 126 of the rider 112, or another body portion), or the weight of any other load the bicycle 100 may be configured to carry. In either case, the frame vibration isolator 200 can be configured to isolate the rider 112 from vibrations transferred through the frame 102. More specifically, in some instances, the frame vibration isolator 200 can be configured to isolate the lower body portion 126 of the rider 112 from vibrations transferred through the frame 102 to the lower body portion 126.

Figure 3:
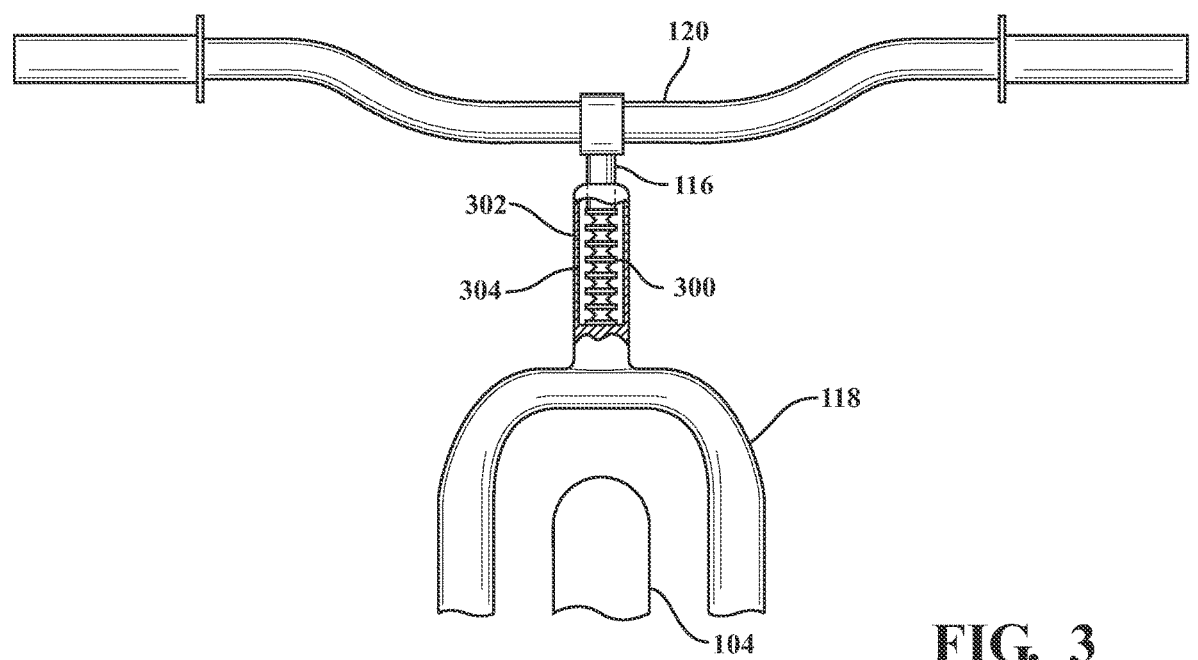
FIG. 3 illustrates an example of a front steering axle vibration isolator operatively connected to a front steering axle of the bicycle.

Referring to FIG. 3, the bicycle 100 can include a front steering axle vibration isolator 300. The front steering axle vibration isolator 300 can be operatively connected to the front steering axle 116 in any suitable manner. In one or more arrangements, the front steering axle vibration isolator 300 can be located within the front steering axle 116. In such case, the front steering axle vibration isolator 300 can be unattached within the front steering axle 116. Alternatively, the front steering axle vibration isolator 300 can be operatively connected to the front steering axle 116 within the front steering axle 116, such as by one or more fasteners, one or more adhesives, one or more forms of mechanical engagement, one or more welds or brazes, or any combination thereof. The front steering axle vibration isolator 300 can be compressed under the load of the rider 112. For example, one end of the front steering axle vibration isolator 300 can be compressed by the weight of a portion of the rider 112 (e.g., the upper body portion 124 of the rider 112). In some instances, movement of the other end of the front steering axle vibration isolator 300 can be restricted by an attachment point (for example, one or more of the fasteners, welds, or brazes), a structure of the front steering axle 116, and/or the front fork assembly 118. In other instances, the front steering axle vibration isolator 300 can be pre-compressed to normal and/or expected operation loads before being installed to the front steering axle 116.

In one or more arrangements, as shown, the front steering axle 116 can include a shaft 302. The shaft 302 can have a telescopic relationship with the front steering axle 116. The shaft 302 can be internally notched with one or more guide tracks 304 to allow telescoping of the front steering axle 116 without free rotation of the front steering axle 116 so that the handlebar assembly 120 still controls the direction of the front wheel 104. The front steering axle vibration isolator 300 can be positioned within the shaft 302 and operatively connected to the front steering axle 116. The front steering axle vibration isolator 300 can be configured to isolate the rider 112 from vibrations transferred to the rider 112 through the front steering axle 116. More specifically, in some instances, the front steering axle vibration isolator 300 can be configured to isolate the upper body portion 124 of the rider 112 from vibrations transferred to the upper body portion 124 through the front steering axle 116.

Figure 4:
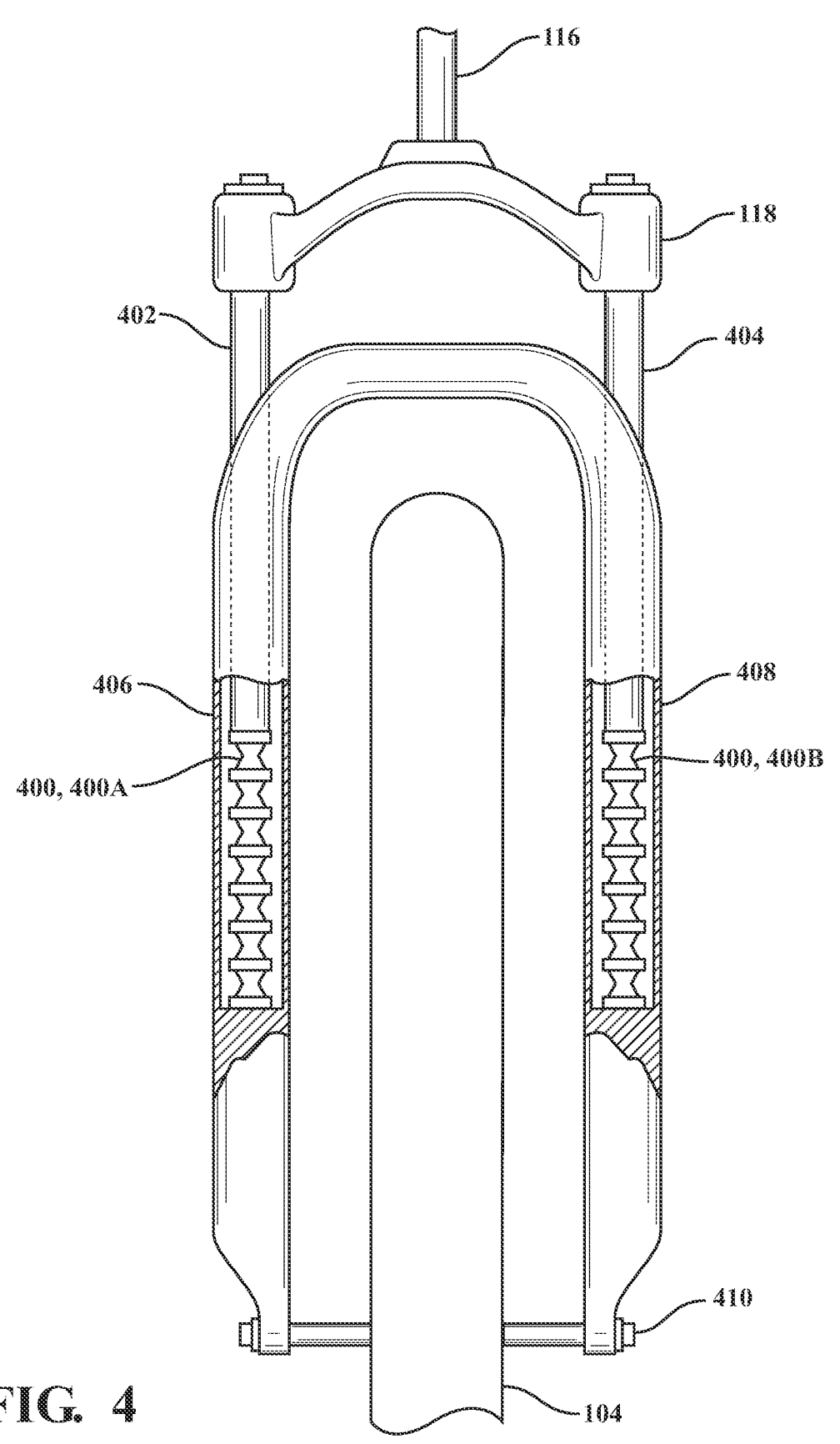
FIG. 4 illustrates an example of front fork assembly vibration isolators operatively connected to a front fork assembly of the bicycle.

Referring to FIG. 4, the bicycle 100 can include one or more front fork assembly vibration isolators 400. The front fork assembly vibration isolator(s) 400 can include a first front fork vibration isolator 400A operatively connected to a first front fork 402 of the front fork assembly 118 and/or a second front fork vibration isolator 400B operatively connected to a second front fork 404 of the front fork assembly 118. The front fork assembly vibration isolator(s) 400 can be operatively connected to the front fork assembly 118 in any suitable manner. In one or more arrangements, the front fork assembly vibration isolator(s) 400 can be located within the front forks 402, 404. In such case, the front fork assembly vibration isolator(s) 400 can be unattached within the front forks 402, 404. Alternatively, the front fork assembly vibration isolator(s) 400 can be operatively connected to the front forks 402, 404 within the front forks 402, 404, such as by one or more fasteners, one or more adhesives, one or more forms of mechanical engagement, one or more welds or brazes, or any combination thereof.

The front fork assembly vibration isolator(s) 400 can be compressed under the load of the rider 112. For example, one end of the front fork assembly vibration isolator(s) 400 can be compressed by the weight of a portion of the rider 112 (e.g., the upper body portion 124 of the rider 112). In some instances, movement of the other end of the front fork assembly vibration isolator(s) 400 can be restricted by an attachment point (for example, one or more of the fasteners, welds, or brazes) and/or a structure of the front fork assembly 118. In other instances, the front fork assembly vibration isolator(s) 400 can be pre-compressed to normal and/or expected operation loads before being installed to the front forks 402, 404.

In one or more arrangements, as shown, the first front fork 402 can include a first telescoping shell 406, and the second front fork 404 can include a second telescoping shell 408. The first front fork vibration isolator 400A can be positioned within the first telescoping shell 406 and operatively connected to the first front fork 402. Similarly, the second front fork vibration isolator 400B can be positioned within the second telescoping shell 408 and operatively connected to the second front fork 404. The first front fork 402 and the second front fork 404 can be connected to a front wheel axle

410 around which the front wheel 104 rotates. The front fork assembly vibration isolators 400 are configured to isolate the rider 112 from vibrations transferred to the rider 112 through the front fork assembly 118. More specifically, in some instances, the front fork vibration isolators 400 can be configured to isolate the upper body portion 124 of the rider 112 from vibrations transferred to the upper body portion 124 through the front fork assembly 118.

Figure 5:
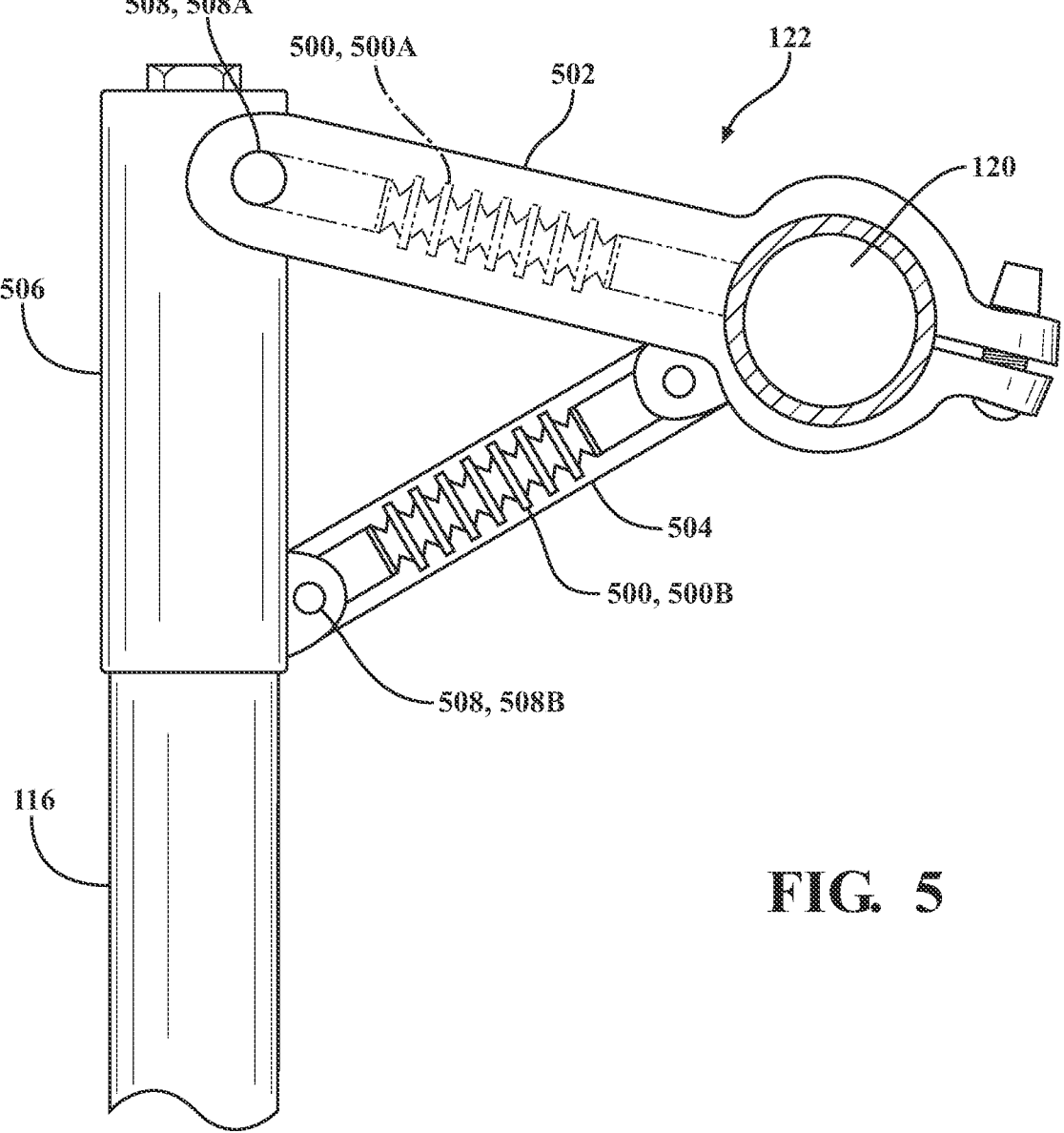
FIG. 5 illustrates an example of handlebar stem device vibration isolators operatively connected to a handlebar stem device of the bicycle.

Additionally or alternatively, referring to FIG. 5, the bicycle 100 can include one or more handlebar stem device vibration isolators 500. The handlebar stem device vibration isolator(s) 500 can be operatively connected to the handlebar stem device 122 in any suitable manner. In one or more arrangements, the handlebar stem device vibration isolator(s) 500 can be located within the handlebar stem device 122. In such case, the handlebar stem device vibration isolator(s) 500 can be unattached within the handlebar stem device 122. Alternatively, the handlebar stem device vibration isolator(s) 500 can be operatively connected to the handlebar stem device 122 within the handlebar stem device 122, such as by one or more fasteners, one or more adhesives, one or more forms of mechanical engagement, one or more welds or brazes, or any combination thereof. The handlebar stem device vibration isolator(s) 500 can be compressed under the load of the rider 112. For example, one end of the handlebar stem device vibration isolator(s) 500 can be compressed by the weight of a portion of the rider 112 (e.g., the upper body portion 124 of the rider 112). In some instances, movement of another end of the handlebar stem device vibration isolator(s) 500 can be restricted by an attachment point (for example, one or more of the fasteners, welds, or brazes) and/or a structure of the handlebar stem device 122. In other instances, the handlebar stem device vibration isolator(s) 500 can be pre-compressed to normal and/or expected operation loads before being installed to the handlebar stem device 122.

The handlebar stem device vibration isolator(s) 500 can include a first handlebar stem device vibration isolator 500A and/or a second handlebar stem device vibration isolator 500B. The handlebar stem device 122 includes a first swing arm 502 and a second swing arm 504 operatively connected to a mounting shaft 506 that can be mounted to the front steering axle 116 at the top of the front fork assembly 118. The first swing arm 502 and the second swing arm 504 can be operatively connected to the mounting shaft 506 using pivot point pins 508. For example, the first swing arm 502 can be connected to the mounting shaft 506 with a first pivot pin 508A, and the second swing arm can be connected to the mounting shaft 506 with a second pivot pin 508B. The first swing arm 502 and the second swing arm 504 can be configured to operatively connect the handlebar assembly 120 to the mounting shaft 506.

The first handlebar stem device vibration isolator 500A can be positioned within the first swing arm 502. Similarly, the second handlebar stem device vibration isolator 500B can be positioned within the second swing arm 504. The handlebar stem device vibration isolator(s) 500 are configured to isolate the rider from vibrations transferred to the rider 112 through the handlebar assembly 120. More specifically, in some instances, the handlebar stem device vibration isolator(s) 500 can be configured to isolate the upper body portion 124 of the rider 112 from vibrations transferred through the handlebar assembly 120 to the upper body portion 124.

In some arrangements, the bicycle 100 can include multiple vibration isolators in any combination of the above-mentioned locations. The use of vibration isolators in multiple components of the bicycle 100 can be advantageous because the vibration isolators can have a combined, synergistic effect on isolation vibration. This is advantageous because, in arrangements in which only one body portion of the rider 112 is isolated from vibrations, the rider 112 can feel an even greater effect of vibrations transferred to another body portion, and the rider 112 can still suffer discomfort and fatigue during their ride even if one body portion is isolated from vibrations. However, when the two or more body portions of the rider 112 are isolated from vibrations, the rider 112 can maintain a comfortable ride without fatigue.

In one or more arrangements, for example, the bicycle 100 can include a frame vibration isolator 200 and one or more front-end vibration isolators. The front-end vibration isolator(s) can include one or more front steering axle vibration isolators 300, one or more front fork assembly vibration isolators 400, and/or one or more handlebar stem device vibration isolators 500. For example, the bicycle 100 can include a frame vibration isolator 200 and a front steering axle vibration isolator 300. The frame vibration isolator 200 and the front steering axle vibration isolator 300 can synergistically isolate both the upper body portion 124 and the lower body portion 126 of the rider 112 from vibrations transferred to the rider 112 through the frame 102 and the front steering axle 116. In another example, the bicycle 100 can include a frame vibration isolator 200 and one or more front fork assembly vibration isolators 400. The frame vibration isolator 200 and the front fork assembly vibration isolator(s) 400 can synergistically isolate both upper body portion 124 and the lower body portion 126 of the rider 112 from vibrations transferred through the frame 102 and the front fork assembly 118. In another example, the bicycle 100 can include a frame vibration isolator and one or more handlebar stem device vibration isolators 500. The frame vibration isolator 200 and the handlebar stem device vibration isolator(s) 500 can synergistically isolate both the upper body portion 124 and the lower body portion 126 of the rider 112 from vibrations transferred to the rider through the frame 102 and the handlebar assembly 120.

In one or more other arrangements, for example, the bicycle 100 can include a frame vibration isolator 200 and any combination of two or more of: a front steering axle vibration isolator 300, one or more front fork assembly vibration isolators 400, and one or more handlebar stem device vibration isolators 500. In one or more other arrangements, for example, the bicycle 100 can include a frame vibration isolator 200, a front steering axle vibration isolator 300, one or more front fork assembly vibration isolators 400, and one or more handlebar stem device vibration isolators 500. All of these vibration isolators together can synergistically isolate different body portions of the rider 112 from vibrations transferred throughout the various elements of the bicycle 100. For instance, all of these vibration isolators together can synergistically isolate both the upper body portion 124 and the lower body portion 126 of the rider 112 from vibrations transferred throughout the various elements of the bicycle 100. In one or more other arrangements, the bicycle 100 can include any suitable combination of a frame vibration isolator 200 and one or more front-end vibration isolators.

Figure 6A:
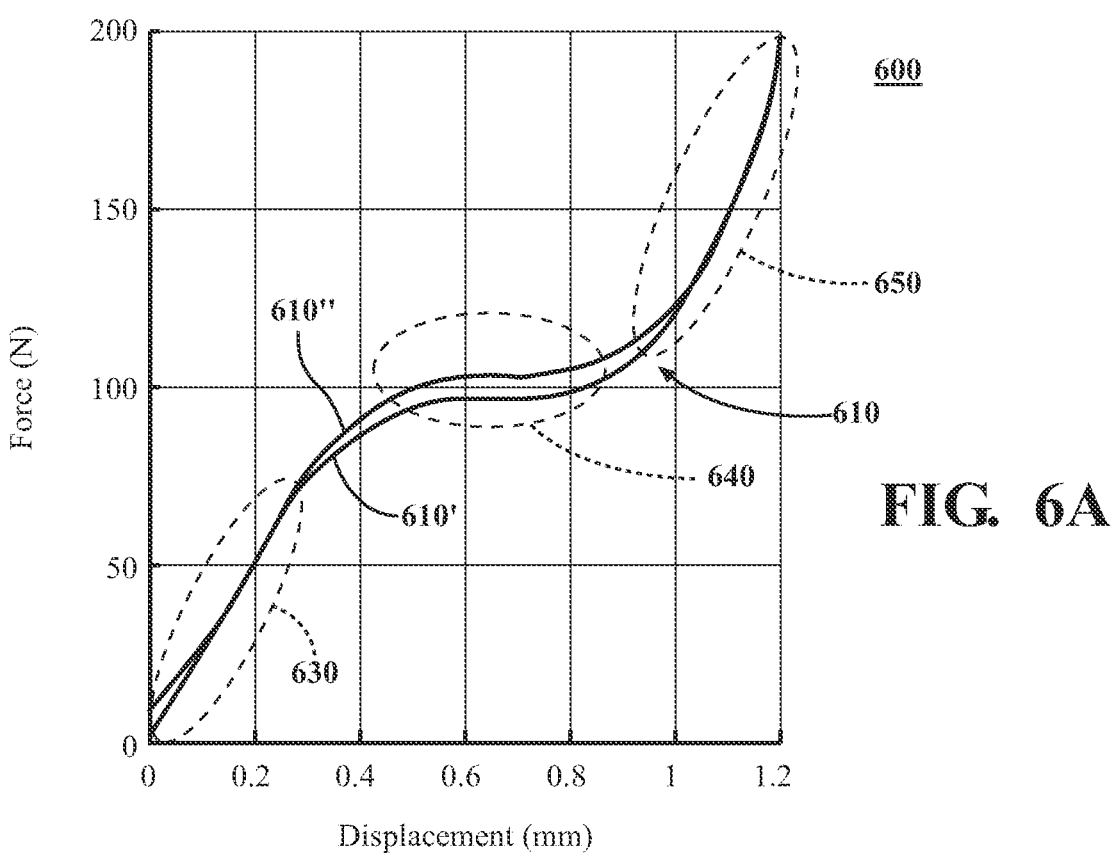
FIG. 6A is an example of a force-deflection curve of a conical spring.

As mentioned above, each of the vibration isolators can be configured to exhibit a non-linear stiffness profile. The non-linear stiffness profile can include a region of quasi-zero stiffness. An example of a force-deflection graph 600 for vibration isolator is shown in FIG. 6A. It is noted that this force-deflection graph 600 is merely an example, as the values will vary depending on various characteristics of the isolator. However, the general shape of a force-deflection curve 610, representing the stiffness profile, is shown. Starting from the origin 620, the vibration isolators can exhibit an initial stiffness region 630 that is substantially linear. The vibration isolator is relatively stiff in the initial stiffness region 630. When load is reached, the force-deflection curve 610 can become zero or substantially zero, which is a quasi-zero stiffness region 640. The quasi-zero stiffness region 640 can allow for good vibration isolation. Continuing beyond the quasi-zero stiffness region 640, the force-deflection curve 610 can have a subsequent stiffness region 650 that is substantially linear. The vibration isolator is relatively stiff in the subsequent stiffness region 650.

It should be noted that there are two force-deflection curves shown in FIG. 6A. A first force-deflection curve 610' represents the vibration isolator going from a non-loaded state to a loaded state. A second force deflection curve 610" represents the vibration isolator going from a loaded state to a non-loaded state.

Figure 6B:
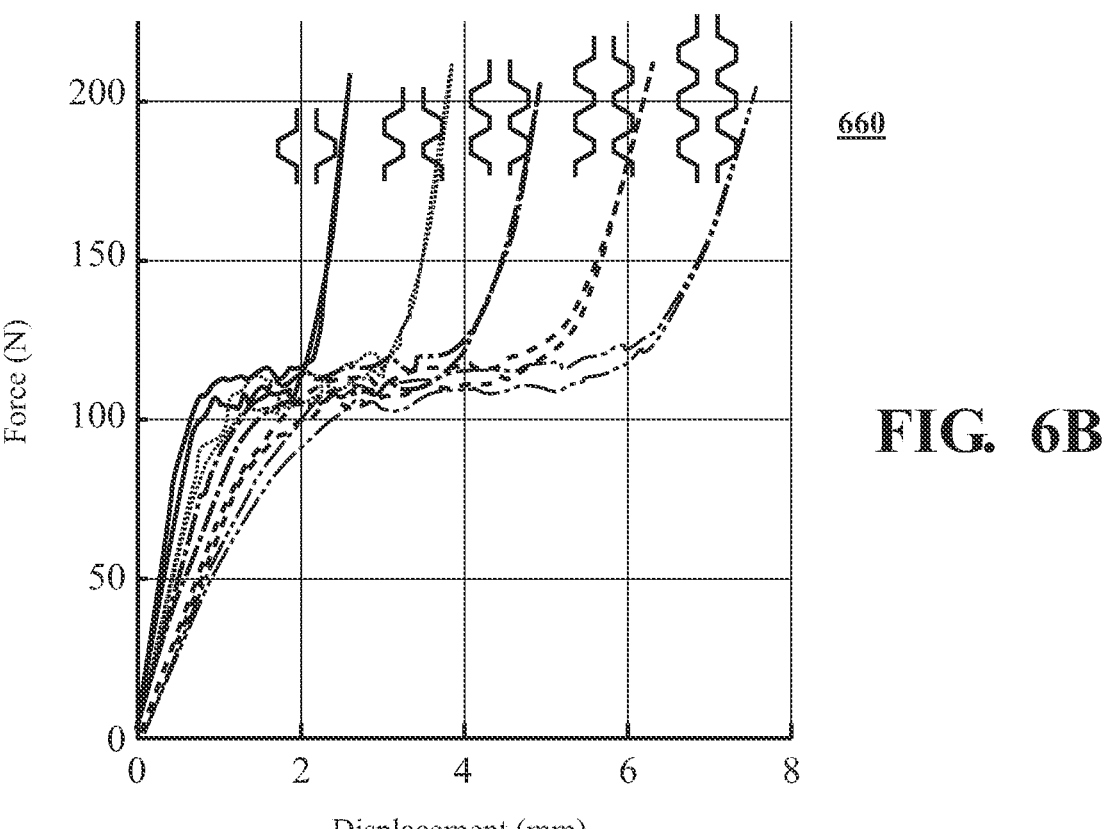
FIG. 6B is an example of the force-deflection curve for various stacks of a plurality of conical springs.
Figure 7:
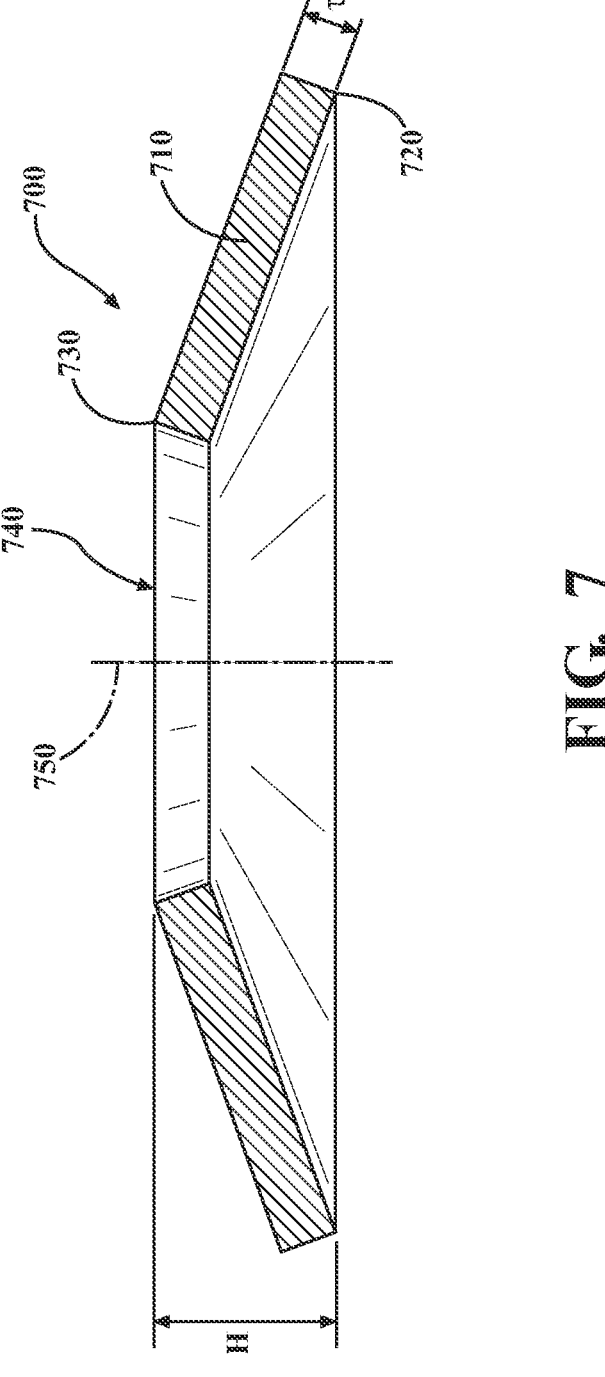
FIG. 7 is a cross-sectional view of an example of a conical spring used in a vibration isolator.

Referring now to FIG. 7, according to arrangements herein, the vibration isolators can include a stack of a plurality of conical springs 700. It should be noted that other terms can be used to describe the conical springs 700 such as Belleville washers, disk springs, conical disks, etc. As more conical springs are added to the stack, the quasi-zero stiffness region 640 of the force-deflection curve 610 can be extended. An example of a force-deflection graph 660 depicting this effect is shown in FIG. 6B. As is evident, the length of the quasi-zero stiffness region increases as the number of conical springs 700 used in the stack increases.

Referring to FIG. 7, an example of a conical spring 700 is shown. The conical spring 700 can have a body 710 with a substantially conical shape. The conical spring 700 can include an outer diameter body portion 720 and an inner diameter body portion 730. The outer diameter body portion 720 can be larger than the inner diameter body portion 730. The conical spring 700 can have a central aperture 740. The conical spring 700 can have a central axis 750. The conical spring can have a height H and a thickness λ. In some arrangements, the conical spring 700 can have a ratio of height H to the thickness λ of about 1 to about 2, about 1.2 to about 1.8, about 1.3 to about 1.5. In some arrangements, the ratio of height H to the thickness λ can be about 1.41.

A plurality of the conical springs 700 can be arranged in any suitable manner in a stack. For instance, in one or more arrangements, the plurality of the conical springs 700 can be arranged in an alternating pattern. For example, the outer diameter body portion 720 of one conical spring 700 can face the outer diameter body portion 720 of a neighboring conical spring 700. Alternatively or additionally, the inner diameter body portion 730 of a conical spring 700 can face the inner diameter body portion 730 of a neighboring conical spring 700. The central apertures 740 of the conical springs 700 can be substantially aligned with each other.

In some arrangements, the stack of the plurality of conical springs 700 does not include a central shaft passes through the central apertures 740 of the plurality of conical springs 700. Alternatively or additionally, the plurality of conical springs 700 does not include an outer sleeve that encloses the plurality of conical springs 700.

There are numerous ways in which the plurality of conical springs 700 can be arranged in a stack. Two examples will be provided herein. However, it will be understood that arrangements are not limited to the two examples described herein.

Referring to FIG. 4, a first example of a vibration isolator 800 is shown in a cross-sectional view. The vibration isolator 800 can include a plurality of the conical springs 700 arranged in a stack 816. The stack 816 of the plurality of the conical springs 700 can have a first outermost conical spring 801 and a second outermost conical spring 802.

The vibration isolator 800 can further include a plurality of inner spacers 810 and a plurality of outer spacers 820. The inner spacers 810 can separate the inner diameter body portion 730 of neighboring pairs of the conical springs 700. The outer spacers 820 can separate the outer diameter body portion 720 of neighboring pairs of the conical springs 700. In some arrangements, the plurality of inner spacers 810 can be substantially identical to each other. In other arrangements, at least one of the inner spacers 810 can be different from the other inner spacers 810 in or more respects. In some arrangements, the plurality of outer spacers 820 can be substantially identical to each other. In other arrangements, at least one of the outer spacers 820 can be different from the other outer spacers 820 in or more respects.

The inner spacers 810 and the outer spacers 820 can be generally cylindrical members. In one or more arrangements, the inner spacers 810 and the outer spacers 820 can have a substantially t-shaped cross-sectional shape. Thus, the inner spacers 810 can include an inner wall portion 812 and a transverse ledge portion 814. The transverse ledge portion 814 can extend outwardly from the inner wall portion 812. The transverse ledge portion 814 can be substantially perpendicular to the inner wall portion 812. The outer spacers 820 can include an outer wall portion 822 and a transverse ledge portion 824. The transverse ledge portion 824 can extend inwardly from the outer wall portion 822. The transverse ledge portion 824 can be substantially perpendicular to the outer wall portion 822.

The inner spacers 810 and the outer spacers 820 can be configured as non-locking spacers. Thus, the outer diameter body portion 720 of the conical springs 700 can rest on or contact the transverse ledge portion 824 of the outer spacers 820. Similarly, the inner diameter body portion 730 can rest on or contact the transverse ledge portion 814 of the inner spacers 810. Thus, the inner spacers 810 and the outer spacers 820 do not lockingly engage the conical springs 700.

The vibration isolator 800 can includes a first endcap 840 and a second endcap 850. The first endcap 840 can be operatively connected to and/or operatively positioned with respect to the first outermost conical spring 701 at a first end 801 of the stack 816. In some arrangements, one or more intermediate structures 803 can be located between the first endcap 840 and the first outermost conical spring 701. In other arrangements, the first endcap 840 and the first outermost conical spring 701 can directly contact each other. The second endcap 850 can be is operatively connected to and/or operatively positioned with respect to the second outermost conical spring 702 at a second end 802 of the stack 816. In some arrangements, one or more intermediate structures 804 can be located between the second endcap 850 and the second outermost conical spring 702. In other arrangements, the second endcap 850 and the first outermost conical spring 701 can directly contact each other.

In some arrangements, the first endcap 840 and the second endcap 850 can be substantially identical to each other. In other arrangements, the first endcap 840 and the second endcap 850 can be different from each other in one or more respects. The first endcap 840 and the second endcap 850 can be made of any suitable material.

Figure 8:
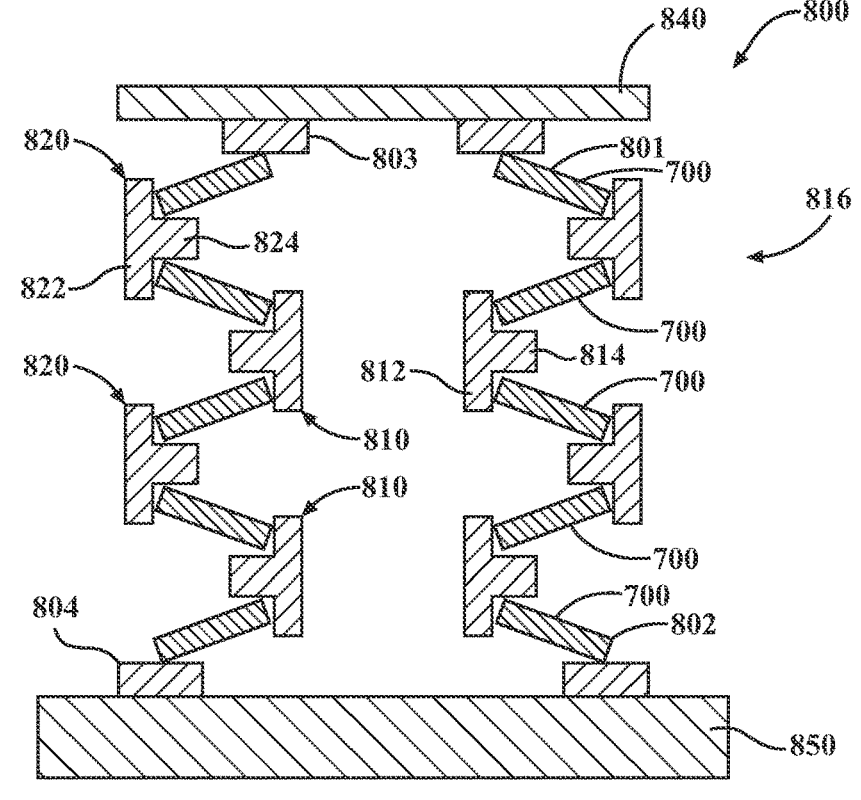
FIG. 8 is a cross-sectional view of a first example of a vibration isolator.

FIG. 8 shows the conical springs 700 in the stack 816 as being in a neutral position. However, as will be explained in more detail later, the vibration isolator 800 can be configured to allow the conical springs 700 in the stack 816 to become flat or even inverted.

Figure 9:
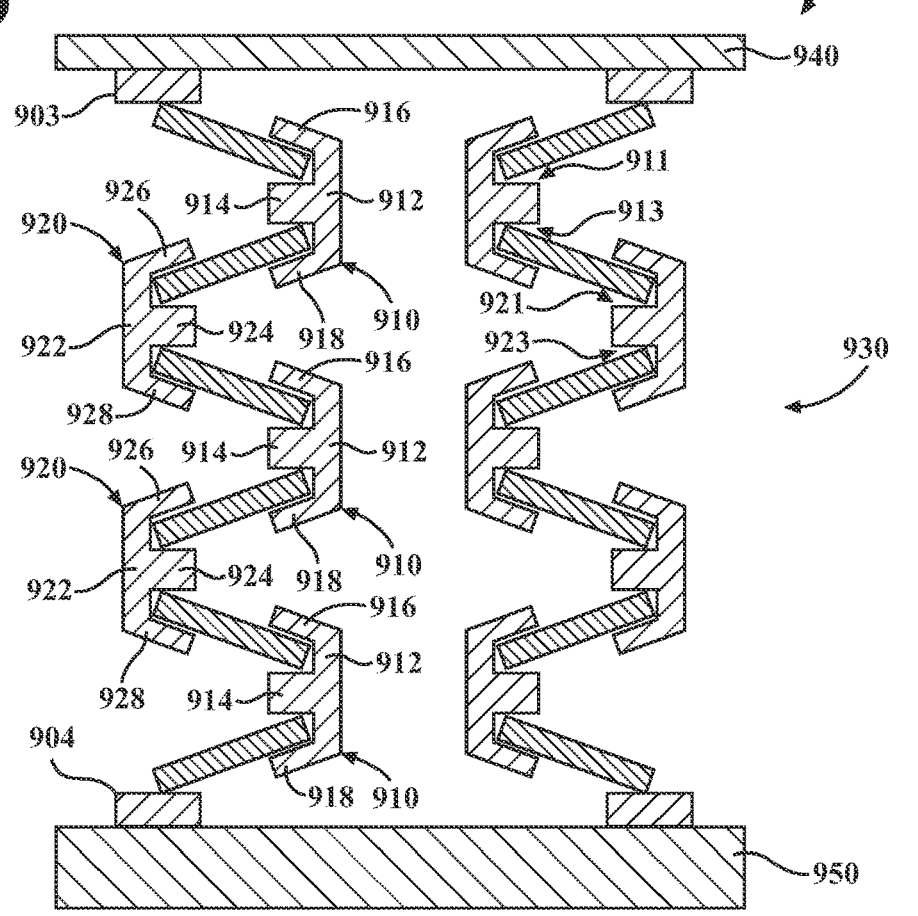
FIG. 9 is a cross-sectional view of a second example of a vibration isolator.

Referring to FIG. 9, a second example of a vibration isolator 900 is shown in a cross-sectional view. The vibration isolator 900 can include a plurality of the conical springs 700 arranged in a stack 930. The stack 930 of the plurality of the conical springs 700 can have a first outermost conical spring 701 and a second outermost conical spring 702.

The vibration isolator 900 can further include a plurality of inner spacers 910 and a plurality of outer spacers 920. The inner spacers 910 can separate the inner diameter body portion 730 of neighboring pairs of the conical springs 700. The outer spacers 920 can separate the outer diameter body portion 720 of neighboring pairs of the conical springs 700. In some arrangements, the plurality of inner spacers 910 can be substantially identical to each other. In other arrangements, at least one of the inner spacers 910 can be different from the other inner spacers 910 in or more respects. In some arrangements, the plurality of outer spacers 920 can be substantially identical to each other. In other arrangements, at least one of the outer spacers 920 can be different from the other outer spacers 920 in or more respects.

The inner spacers 910 and the outer spacers 920 can be generally cylindrical members. In one or more arrangements, the inner spacers 910 and the outer spacers 920 can have a substantially E-shaped or a substantially 3-shaped cross-sectional shape. Thus, the inner spacers 910 can include an inner wall portion 912, a central transverse ledge portion 914, an upper transverse ledge portion 916, and a lower transverse ledge portion 918. It will be appreciated that the terms "upper" and "lower" are used for convenience in this respect relative to the orientation of the inner spacers 910 shown in FIG. 9. However, it will be appreciated that the upper transverse ledge portion 916 and the lower transverse ledge portion 918 may not actually be above or below the central transverse ledge portion 914 depending on the orientation of the vibration isolator 900. A first groove 911 can be defined by the inner wall portion 912, the central transverse ledge portion 914, and the upper transverse ledge portion 916. A second groove 913 can be defined by the inner wall portion 912, the central transverse ledge portion 914, and the lower transverse ledge portion 918.

The central transverse ledge portion 914 can extend outwardly from the inner wall portion 912. The central transverse ledge portion 914 can be substantially perpendicular to the inner wall portion 912. In some arrangements, the upper transverse ledge portion 916 and the lower transverse ledge portion 918 can be non-parallel to the central transverse ledge portion 914. In some arrangements, the upper transverse ledge portion 916 and the lower transverse ledge portion 918 can be non-parallel to each other.

The outer spacers 920 can include an outer wall portion 922, a central transverse ledge portion 924, an upper transverse ledge portion 926, and a lower transverse ledge portion 928. Again, the terms "upper" and "lower" are used merely for convenience in this respect relative to the orientation of the inner spacers 910 shown in FIG. 9. A first groove 921 can be defined by the outer wall portion 922, the central transverse ledge portion 924, and the upper transverse ledge portion 926. A second groove 923 can be defined by the outer wall portion 922, the central transverse ledge portion 924, and the lower transverse ledge portion 928.

The central transverse ledge portion 924 can extend outwardly from the outer wall portion 922. The central transverse ledge portion 924 can be substantially perpendicular to the outer wall portion 922. In some arrangements, the upper transverse ledge portion 926 and the lower transverse ledge portion 928 can be non-parallel to the central transverse ledge portion 924. In some arrangements, the upper transverse ledge portion 926 and the lower transverse ledge portion 928 can be non-parallel to each other.

The inner spacers 910 and the outer spacers 920 can be configured as locking spacers. The outer diameter body portion 720 of the conical springs 700 can be received in one of the first groove 921 and the second groove 923 of the outer spacer 920. Thus, the outer diameter body portion 720 of the conical springs 700 can be lockingly engaged by and/or retainably received in the respective one of the first groove 921 and the second groove 923 of the outer spacer 920. Similarly, the inner diameter body portion 730 of the conical springs 700 can be received in one of the first groove 911 and the second groove 913 of the inner spacer 910. Thus, the inner diameter body portion 730 of the conical springs 700 can be lockingly engaged by and/or retainably received in the respective one of the first groove 911 and the second groove 913 of the inner spacer 910.

The vibration isolator 900 can includes a first endcap 940 and a second endcap 950. The first endcap 940 can be operatively connected to and/or operatively positioned with respect to the first outermost conical spring 701 at a first end 901 of the stack 930. In some arrangements, one or more intermediate structures 903 can be located between the first endcap 940 and the first outermost conical spring 701. In other arrangements, the first endcap 940 and the first outermost conical spring 701 can directly contact each other. The second endcap 950 can be operatively connected to and/or operatively positioned with respect to the second outermost conical spring 702 at a second end 902 of the stack 930. In some arrangements, one or more intermediate structures 904 can be located between the second endcap 950 and the second outermost conical spring 702. In other arrangements, the second endcap 950 and the second outermost conical spring 702 can directly contact each other.

In some arrangements, the first endcap 940 and the second endcap 950 can be substantially identical to each other. In other arrangements, the first endcap 940 and the second endcap 950 can be different from each other in one or more respects. The first endcap 940 and the second endcap 950 can be made of any suitable material.

FIG. 8 shows an example in which the inner spacers 810 and the outer spacers 820 are non-locking spacers, and FIG. 9 shows an example in which the inner spacers 910 and the outer spacers 920 are locking spacers. However, it will be understood that arrangements described herein are not limited in this regard. Indeed, the vibration isolators can use any combination of locking and non-locking spacers for the inner spacers and/or the outer spacer. For example, the inner spacers can be locking spacers, and the outer spacers can be non-locking spacers, or vice versa. As another example, the inner spacers can be all locking spacers, all non-locking spacers, or any combination of locking spacers and non-locking spacers. Similarly, the outer spacers can be all locking spacers, all non-locking spacers, or any combination of locking spacers and non-locking spacers.

Further, it will be appreciated that the two vibration isolator configurations described herein are not the only vibration isolator configurations that can be used. Indeed, additional examples of the vibration isolators can include any of those disclosed in U.S. Pat. Nos. 10,371,229 and 10,677,310 as well as U.S. Patent Publ. No. 2019/0186589, which are incorporated herein by reference in their entireties.

Figure 10A:
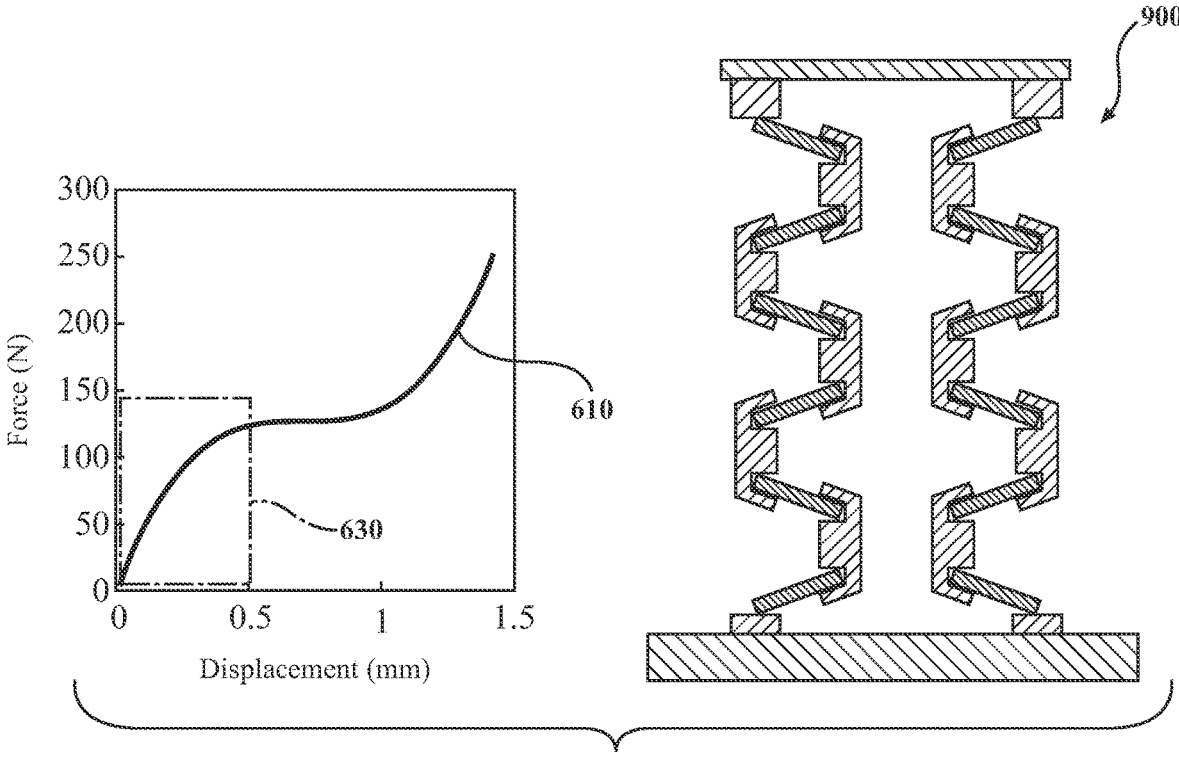
FIG. 10A-10C show the state of the vibration isolator shown in FIG. 9 at various regions of the force-deflection curve.
Figure 10B:
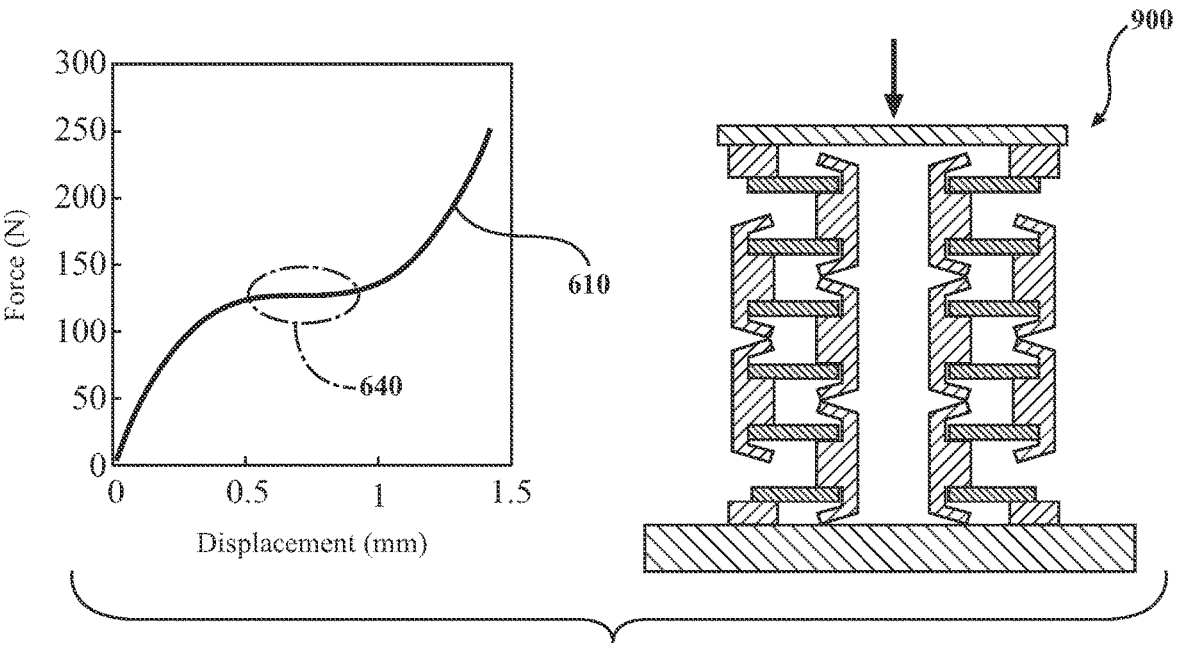
Figure 10C:
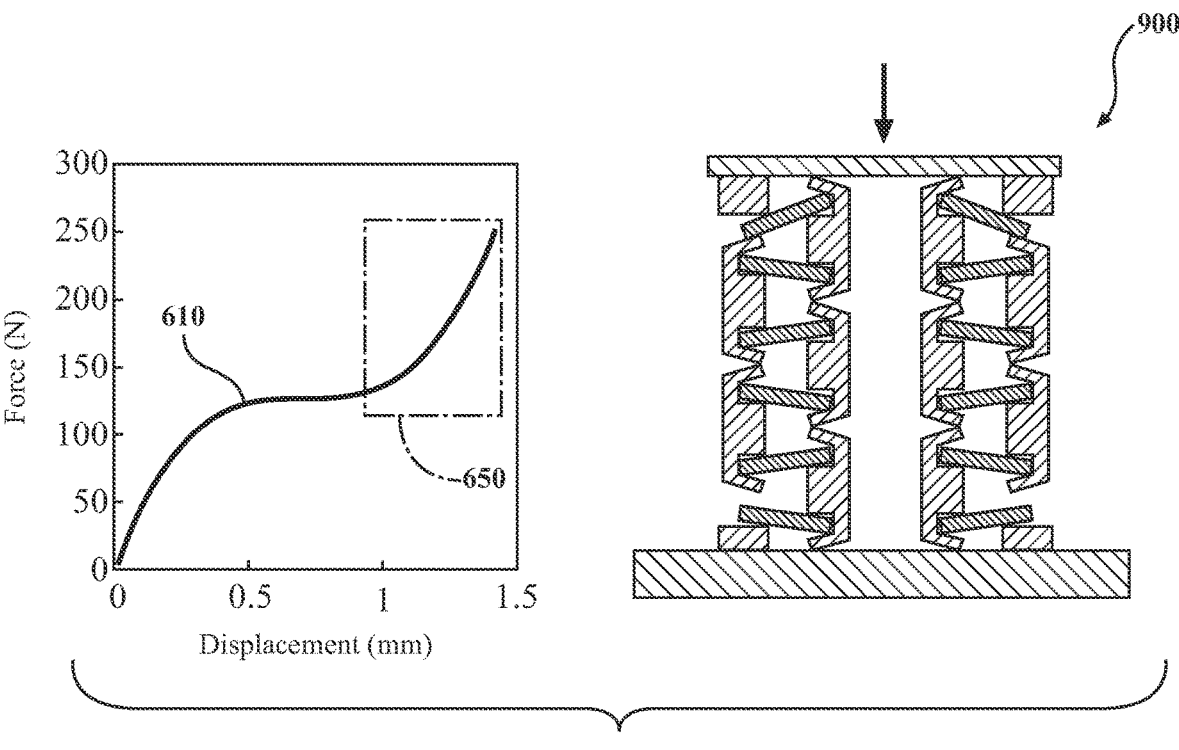

FIG. 10A-10C show the state of the vibration isolator 900 of FIG. 9 in various regions of the force-deflection curve. FIG. 10A shows a representation of the vibration isolator 900 in the initial stiffness region 630 of the force-deflection curve 610. As can be seen, the conical springs 700 can be substantially in their neutral condition. In the initial stiffness region 630, the stiffness curve is substantially linear, increasing from the origin of the graph. The vibration isolator 900 can be relatively stiff in the initial stiffness region 630.

In FIG. 10B, the vibration isolator 900 is in the quasi-zero stiffness region 640 of the force-deflection curve 610. In the quasi-zero stiffness region 640, the force-deflection curve becomes substantially flat. The stiffness becomes very low—zero or substantially zero. The quasi-zero stiffness region 640 allows for good isolation. In the quasi-zero stiffness region 640, the conical springs 700 can become substantially flat.

In FIG. 10C, the isolator can be in the subsequent stiffness region 650. In the subsequent stiffness region 650, the stiffness curve can be substantially linear, increasing from the end of the quasi-zero stiffness region 640. The vibration isolator 900 can be relatively stiff in the initial stiffness region 630. As can be seen, the conical springs 700 can become inverted relative to their initial shape. It will be appreciated that the configuration of the vibration isolator 900 allows such inversion to occur.

It will be appreciated that the characteristics of the quasi-zero stiffness region can be tuned to attain the desired performance characteristics. Such tuning can be achieved by changing the characteristics of the conical springs, the quantity of the conical springs, the arrangement of the conical springs, other components of the isolators, and/or other factors, just to name a few possibilities.

The arrangements described herein have the benefit of isolating a rider of a bicycle from vibrations transferred to the rider. The arrangements described herein can isolate both an upper body portion of the rider and a lower body portion of the rider from vibrations transferred through various components of a frame of the bicycle, for example, the frame itself, a front steering axle of the bicycle, a front fork assembly of the bicycle, and/or a handlebar assembly of the bicycle. The arrangements described herein can improve the comfort of the ride as well as mitigate fatigue of the rider when using the bicycle.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "or" is intended to mean an inclusive "or" rather than an exclusive "or." The phrase "at least one of . . . and . . . ." as used herein refers to and encompasses any and all possible combinations of one or more of the associated listed items. As an example, the phrase "at least one of A, B and C" includes A only, B only, C only, or any combination thereof (e.g., AB, AC, BC, or ABC). As used herein, the term "substantially" or "about" includes exactly the term it modifies and slight variations therefrom. Thus, the term "substantially parallel" means exactly parallel and slight variations therefrom. "Slight variations therefrom" can include within 15 degrees/percent/units or less, within 14 degrees/percent/units or less, within 13 degrees/percent/units or less, within 12 degrees/percent/units or less, within 11 degrees/percent/units or less, within 10 degrees/percent/units or less, within 9 degrees/percent/units or less, within 8 degrees/percent/units or less, within 7 degrees/percent/units or less, within 6 degrees/percent/units or less, within 5 degrees/percent/units or less, within 4 degrees/percent/units or less, within 3 degrees/percent/units or less, within 2 degrees/percent/units or less, or within 1 degree/percent/unit or less. In some instances, "substantially" can include being within normal manufacturing tolerances.

Aspects herein can be embodied in other forms without departing from the spirit or essential attributes thereof. Accordingly, reference should be made to the following claims, rather than to the foregoing specification, as indicating the scope hereof.

What is claimed is:

1. A bicycle, comprising:
a frame including a front steering axle, a front fork assembly, and a handlebar assembly for steering a front wheel of the bicycle and including a handlebar stem device including first and second swing arms operatively connected to a mounting shaft; and
one or more vibration isolators located internally within and directly connected to the frame, pre-compressed to an operational load prior to installation to the frame, and configured to exhibit a non-linear stiffness profile including a region of quasi-zero stiffness, the one or more vibration isolators including a handlebar stem device vibration isolator operatively connected to at least one of the first and second swing arms, whereby the one or more vibration isolators isolate a rider of the bicycle from vibrations transferred through the frame and the handlebar assembly.

2. The bicycle of claim 1, wherein the one or more vibration isolators include a frame vibration isolator operatively connected to the frame, and wherein the frame vibration isolator is configured to isolate the rider from vibrations transferred through the frame.

3. The bicycle of claim 1, wherein the one or more vibration isolators include a front steering axle vibration isolator operatively connected to the front steering axle, and wherein the front steering axle vibration isolator is configured to isolate the rider from vibrations transferred through the front steering axle.

4. The bicycle of claim 1, wherein the front fork assembly includes a first front fork and a second front fork, wherein the one or more vibration isolators include a first front fork vibration isolator operatively connected to the first front fork and a second front fork vibration isolator operatively connected to the second front fork, wherein the first front fork vibration isolator and the second front fork vibration isolator are configured to isolate the rider from vibrations transferred through the front fork assembly.

5. The bicycle of claim 1, wherein the one or more vibration isolators include a stack of a plurality of conical springs arranged in an alternating pattern, wherein each of the plurality of conical springs includes an outer diameter body portion and an inner diameter body portion, and wherein, for each of the plurality of conical springs, at least one of:
the outer diameter body portion faces the outer diameter body portion of a neighboring one of the plurality of conical springs; and
the inner diameter body portion faces the inner diameter body portion of a neighboring one of the plurality of conical springs.

6. The bicycle of claim 5, wherein the one or more vibration isolators include a plurality of inner spacers, wherein the plurality of inner spacers separate the inner diameter body portion of a neighboring pair of the conical springs, and wherein the plurality of inner spacers engage the inner diameter body portion of the neighboring pair of the conical springs.

7. The bicycle of claim 5, wherein the one or more vibration isolators include a plurality of outer spacers, wherein the outer spacers separate the outer diameter body portion of a neighboring pair of the conical springs, and wherein the plurality of outer spacers engage the outer diameter body portion of the neighboring pair of the conical springs.

8. The bicycle of claim 1, wherein the operational load corresponds to a weight of a body portion of a rider of the bicycle associated with the one or more vibration isolators.

9. A bicycle, comprising:
a frame including a front-end having a front steering axle, a front fork assembly, and a handlebar assembly for steering a front wheel of the bicycle and including a handlebar stem device including first and second swing arms operatively connected to a mounting shaft; and
one or more vibration isolators located internally within and directly connected to the frame, pre-compressed to an operational load prior to installation to the frame, and configured to exhibit a non-linear stiffness profile including a region of quasi-zero stiffness, and the one or more vibration isolators including:
a frame vibration isolator operatively connected to the frame;
one or more front-end vibration isolators operatively connected to at least one of the front steering axle, the front fork assembly, and the handlebar assembly; and
a handlebar stem device vibration isolator operatively connected to at least one of the first and second swing arms, whereby the frame vibration isolator, the one or more front-end vibration isolators, and the handlebar stem device vibration isolator are configured to synergistically isolate different body portions of a rider of the bicycle from vibrations transferred through the frame and the handlebar assembly.

10. The bicycle of claim 9, wherein the frame vibration isolator is configured to isolate a lower body portion of the rider from vibrations transferred through the frame.

11. The bicycle of claim 9, wherein the one or more front-end vibration isolators include a front steering axle vibration isolator operatively connected to the front steering axle, and wherein the front steering axle vibration isolator is configured to isolate an upper body portion of the rider from vibrations transferred through the front steering axle.

12. The bicycle of claim 9, wherein the front fork assembly includes a first front fork and a second front fork, wherein the one or more front-end vibration isolators include a first front fork vibration isolator operatively connected to the first front fork and a second front fork vibration isolator operatively connected to the second front fork, wherein the first front fork vibration isolator and the second front fork vibration isolator are configured to isolate an upper body portion of the rider from vibrations transferred through the front fork assembly.

13. The bicycle of claim 9, wherein the one or more vibration isolators include a stack of a plurality of conical springs arranged in an alternating pattern, wherein each of the plurality of conical springs includes an outer diameter body portion and an inner diameter body portion, and wherein, for each of the plurality of conical springs, at least one of:

the outer diameter body portion faces the outer diameter body portion of a neighboring one of the plurality of conical springs; and the inner diameter body portion faces the inner diameter body portion of a neighboring one of the plurality of conical springs.

14. The bicycle of claim 13, wherein the one or more vibration isolators include a plurality of inner spacers, wherein the plurality of inner spacers separate the inner diameter body portion of a neighboring pair of the conical springs, and wherein the plurality of inner spacers engage the inner diameter body portion of the neighboring pair of the conical springs.

15. The bicycle of claim 13, wherein the one or more vibration isolators include a plurality of outer spacers, wherein the outer spacers separate the outer diameter body portion of a neighboring pair of the conical springs, and wherein the plurality of outer spacers engage the outer diameter body portion of the neighboring pair of the conical springs.

16. The bicycle of claim 9, wherein the operational load corresponds to a weight of a body portion of a rider of the bicycle associated with the one or more vibration isolators.

17. A bicycle, comprising:

a frame including a front steering axle, a front fork assembly, and a handlebar assembly for steering a front wheel of the bicycle and including a handlebar stem device including first and second swing arms operatively connected to a mounting shaft; and a plurality of vibration isolators each located internally within and directly connected to the frame, pre-compressed to an operational load prior to installation to the frame, and configured to exhibit a non-linear stiffness profile including a region of quasi-zero stiffness, and the plurality of vibration isolators including:

a frame vibration isolator operatively connected to the frame;

a front steering axle vibration isolator operatively connected to the front steering axle;

two front fork vibration isolators each operatively connected to the front fork assembly;

one or more handlebar assembly vibration isolators each operatively connected to the handlebar assembly; and a handlebar stem device vibration isolator operatively connected to at least one of the first and second swing arms, whereby the plurality of vibration isolators are configured to synergistically isolate an upper body portion and a lower body portion of a rider of the bicycle from vibrations transferred through the frame and the handlebar assembly.

18. The bicycle of claim 17, wherein the operational load corresponds to a weight of a body portion of a rider of the bicycle associated with the plurality of vibration isolators.

* * * * *